United States Patent
Krause et al.

(10) Patent No.: US 7,924,818 B2
(45) Date of Patent: *Apr. 12, 2011

(54) METHOD AND APPARATUS FOR PROVIDING INTEGRATED VOICE AND DATA SERVICES OVER A COMMON INTERFACE DEVICE

(75) Inventors: Joel M. Krause, Princeton, TX (US); G. Lance Lockhart, Allen, TX (US); John L. Truetken, McKinney, TX (US); Christopher A. Martin, Cedar Hill, TX (US); Jeffery A. Haltom, Fishers, IN (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1281 days.

This patent is subject to a terminal disclaimer.

(21) Appl. No.: 11/359,422

(22) Filed: Feb. 23, 2006

(65) Prior Publication Data

US 2006/0153242 A1 Jul. 13, 2006

Related U.S. Application Data

(63) Continuation of application No. 10/800,394, filed on Mar. 12, 2004, now Pat. No. 7,020,130.

(60) Provisional application No. 60/454,470, filed on Mar. 13, 2003.

(51) Int. Cl.
H04L 12/66 (2006.01)
(52) U.S. Cl. ...................................................... 370/352
(58) Field of Classification Search .................. None
See application file for complete search history.

(56) References Cited

U.S. PATENT DOCUMENTS

| 6,510,509 | B1 | 1/2003 | Chopra et al. |
| 6,757,266 | B1 * | 6/2004 | Hundscheidt ................. 370/328 |
| 6,775,269 | B1 | 8/2004 | Kaczmarczyk et al. |
| 7,020,130 | B2 * | 3/2006 | Krause et al. ................. 370/352 |
| 7,120,141 | B2 * | 10/2006 | Kikinis ......................... 370/352 |
| 2002/0023089 | A1 | 2/2002 | Woo |
| 2002/0061096 | A1 * | 5/2002 | Lautenschlager et al. ............................ 379/142.01 |

(Continued)

FOREIGN PATENT DOCUMENTS

EP 1113659 7/2001

(Continued)

OTHER PUBLICATIONS

Droms, R., "Dynamic Host Configuration Protocol", Internet Engineering Task Force, Network Working Group, Request for Comments 2131, Mar. 1997.

(Continued)

*Primary Examiner* — Anh-Vu Ly

(57) ABSTRACT

An approach is provided for supporting integrated voice and data services over a common Session Initiation Protocol (SIP)-based Customer Premise Equipment (CPE) device. The device includes a network interface that receives a call from a calling party device to a called party device. Also, the device has signaling conversion logic configured to convert between Session Initiation Protocol (SIP) signaling and circuit-switched telephony signaling to support the call, wherein addressing information of the calling party device is preserved in the conversion. The called party device includes one of a telephone station and a SIP client. The device further includes a voice port coupled to the signaling conversion logic and configured to communicate selectively with the telephone station; and a data port configured to communicate selectively with the SIP client.

19 Claims, 12 Drawing Sheets

U.S. PATENT DOCUMENTS

| | | |
|---|---|---|
| 2002/0133588 A1 | 9/2002 | Doyle et al. |
| 2002/0156900 A1 | 10/2002 | Marquette et al. |
| 2004/0028080 A1 | 2/2004 | Samarasinghe et al. |
| 2004/0095923 A1 | 5/2004 | Ejzak et al. |
| 2004/0120498 A1 | 6/2004 | Sylvain |
| 2004/0136398 A1 | 7/2004 | Enzmann et al. |
| 2004/0141759 A1 | 7/2004 | Stiscia et al. |
| 2004/0176085 A1 | 9/2004 | Phillips et al. |
| 2004/0181686 A1 | 9/2004 | Krause et al. |
| 2004/0205209 A1 | 10/2004 | Wengrovitz et al. |

FOREIGN PATENT DOCUMENTS

| | | |
|---|---|---|
| GB | 2369746 | 6/2002 |
| WO | WO 99/60813 | 11/1999 |

OTHER PUBLICATIONS

Bormann, C., "The Multi-Class Extension to Multi-Link PPP", Internet Engineering Task Force, Network Working Group, Request for Comments 2686, Sep. 1999.

Marshall AT&T Kramakrishnan Teraoptic Networks E Miller Terayon Russell Cablelabs B Beser Juniper Networks M Mannette K Steinbr: "SIP Extensions for Network-Asserted Caller Identity and Privacy within Trusted Networks; draft-ietf-sip-privacy-04.txt" Standard-Working-Draft, Internet Engineering Task Force, IETF, CH, vol. sip, No. 4, Feb. 27, 2002.

Chris Hogg Nortel Networks Mark Watson Nortel Networks: "Proposed Annex C.1 OEB AMpquote; Inter working of CLIP/CLIR supplementary services with SIP networks OEB AMpquote; D.283" ITU-T Draft-Study Period 2001-2004, International Telecommuncation Union, Geneva; CH, vol. Study Group II, Feb. 18, 2002, pp. 1-7.

* cited by examiner

METHOD AND APPARATUS FOR PROVIDING INTEGRATED VOICE AND DATA SERVICES OVER A COMMON INTERFACE DEVICE

RELATED APPLICATIONS

This application is a continuation of U.S. patent application Ser. No. 10/800,394, filed Mar. 12, 2004, now U.S. Pat. No. 7,020,130 entitled "Method and Apparatus for Providing Integrated Voice and Data Services Over a Common Interface Device," and claims the benefit of the earlier filing date under 35 U.S.C. §119(e) of U.S. Provisional Patent Application 60/454,470, filed Mar. 13, 2003, entitled "Integrated Customer Premise Equipment Device"; the entirety of each is incorporated herein by reference.

FIELD OF THE INVENTION

The present invention relates to communications, and more particularly, to supporting communication services over an integrated interface device.

BACKGROUND OF THE INVENTION

Advances in communication technologies, fueled, in part, by consumer demands, continually challenge telecommunications service providers to introduce new and ever increasing number of services and product offerings. For example, given their reliance on the global Internet as a business tool as well as a vehicle for news and entertainment, these consumers seek a cost-effective solution to obtain secure broadband, wireless, and Internet services, and other advanced services including Internet Protocol (IP) telephony. Conversely, the service providers aim to deploy new services without having to commit, on routine basis, to development new hardware.

The popularity and convenience of the Internet has resulted in the reinvention of traditional telephony services. These services are offered over a packet switched network with minimal or no cost to the users. IP telephony, thus, have found significant success, particularly in the long distance market. In general, IP telephony, which is also referred to as Voice-over-IP (VoIP), is the conversion of voice information into data packets that are transmitted over an IP network. Users also have turned to IP telephony as a matter of convenience in that both voice and data services are accessible through a single piece of equipment, namely a personal computer. Furthermore, traditional analog phones can enjoy the benefits of VoIP technology through the use of network adapters. The continual integration of voice and data services further drives this demand for IP telephony applications. Such integration stems, in part, from the emergence of ubiquitous broadband services.

Because of the ever growing sophistication in communication services, traditional approaches to supplying a secure broadband service require numerous components to be purchased and maintained by the consumers. In other words, whether a customer desires simple Internet access or a firewall for their local area network (LAN), the customer is forced, under conventional service deployments, to support many different pieces of equipment in their network. For the consumers at large, commercial and residential, the continual addition of new hardware for each new service or feature is burdensome, not only in terms of cost, but time and effort to install and maintain new equipment and associated software.

Therefore, there is a need for supporting a multiplicity of communication services, conveniently and cost-effectively. There is also a need to avoid costly development of new hardware to deploy new services and features.

SUMMARY OF THE INVENTION

These and other needs are addressed by the present invention, in which an approach is presented for providing an integrated Session Initiation Protocol (SIP) enabled Customer Premise Equipment (CPE) device that supports firewall capabilities, quality of service (QoS) processing, routing capabilities, and data network (e.g., Ethernet) switching functionality. The device converts SIP signaling to non-SIP compliant signaling (e.g., PRI and Channel Associated Signaling (CAS)) in support of calls. This single CPE device approach advantageously permits customers to update or add new features and/or services in a modular fashion, without "forklift" upgrading of hardware and software.

According to one aspect of the present invention, an apparatus for supporting a plurality of data and voice services is disclosed. The apparatus includes a network interface configured to receive a call from a calling party device to a called party device. Also, the apparatus includes signaling conversion logic configured to convert between Session Initiation Protocol (SIP) signaling and circuit-switched telephony signaling to support the call, wherein addressing information of the calling party device is preserved in the conversion, and the called party device includes one of a telephone station and a SIP client. The apparatus further includes a voice port coupled to the signaling conversion logic and configured to communicate selectively with the telephone station; and a data port configured to communicate selectively with the SIP client.

According to another aspect of the present invention, a method for supporting a plurality of data and voice services over a common customer premise equipment (CPE) device is disclosed. The method includes receiving a call from a calling party device to a called party device. The method also includes converting between Session Initiation Protocol (SIP) signaling and circuit-switched telephony signaling to support the call, wherein addressing information of the calling party device is preserved in the conversion, and the called party device includes one of a telephone station and a SIP client. Further, the method includes selectively communicating via a voice port interfacing the telephone station; and selectively communicating via a data port interfacing the SIP client.

According to another aspect of the present invention, a computer-readable medium carrying one or more sequences of one or more instructions for supporting a plurality of data and voice services over a common customer premise equipment (CPE) device is disclosed. The one or more sequences of one or more instructions including instructions which, when executed by one or more processors, cause the one or more processors to perform the steps of receiving a call from a calling party device to a called party device; converting between Session Initiation Protocol (SIP) signaling and circuit-switched telephony signaling to support the call, wherein addressing information of the calling party device is preserved in the conversion, and the called party device includes one of a telephone station and a SIP client. Other steps include selectively communicating via a voice port interfacing the telephone station; and selectively communicating via a data port interfacing the SIP client.

According to another aspect of the present invention, a method for providing multiple communication services over a common interface device is disclosed. The method includes receiving telephony signaling pertaining to a call from a calling party according to a first signaling protocol compatible with a circuit-switched network. The method also includes generating a call setup message according to a second signaling protocol compatible with a data network; and determining whether the telephony signaling comprises address information pertaining to the calling party. Further, the method includes inserting a header into the call setup message. The header contains a network address corresponding to the address information.

According to another aspect of the present invention, a network device for providing multiple communication services is disclosed. The device includes means for receiving telephony signaling pertaining to a call from a calling party according to a first signaling protocol compatible with a circuit-switched network; means for generating a call setup message according to a second signaling protocol compatible with a data network; means for determining whether the telephony signaling comprises address information pertaining to the calling party; and means for inserting a header into the call setup message. The header contains a network address corresponding to the address information.

According to another aspect of the present invention, a method for managing signaling in a communications system is disclosed. The method includes receiving a first signaling message compliant with a Session Initiation Protocol (SIP) and indicative of a call to a telephony system that uses a telephony signaling protocol that is not compliant with SIP. The method also includes creating a second signaling message according to the telephony signaling protocol. Further, the method includes responsive to whether the first signaling message includes a remote party identification header, providing a calling party number element in the second signaling message, wherein the content of the calling party number element is derived from the content of the remote party identification header.

According to another aspect of the present invention, a network device for supporting integrated voice and data services is disclosed. The network device includes one or more voice ports configured to communicate with one or more analog devices; one or more data ports configured to communicate with one or more Session Initiation Protocol (SIP) devices; one or more network ports configured to communicate with a network; and firewall logic configured to filter traffic received from the one or more network ports. The network device also includes quality of service (QoS) logic configured to perform QoS processing on traffic received from the one or more voice ports, the one or more data ports, and the one or more network ports.

According to yet another aspect of the present invention, a network device for supporting integrated voice and data services is disclosed. The network device includes at least one voice port configured to communicate with at least one analog telephone; at least one voice trunk configured to communicate with a private branch exchange; at least one data port configured to communicate with at least one Session Initiation Protocol (SIP) device; and at least one network port configured to communicate with a network. Additionally, the network device includes management logic configured to provide quality of service (QoS) management and security for the at least one voice port, the at least one voice trunk, the at least one data port, and the at least one network port.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for providing an integrated Customer Premise Equipment (CPE) interface device for supporting multiple communication services are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
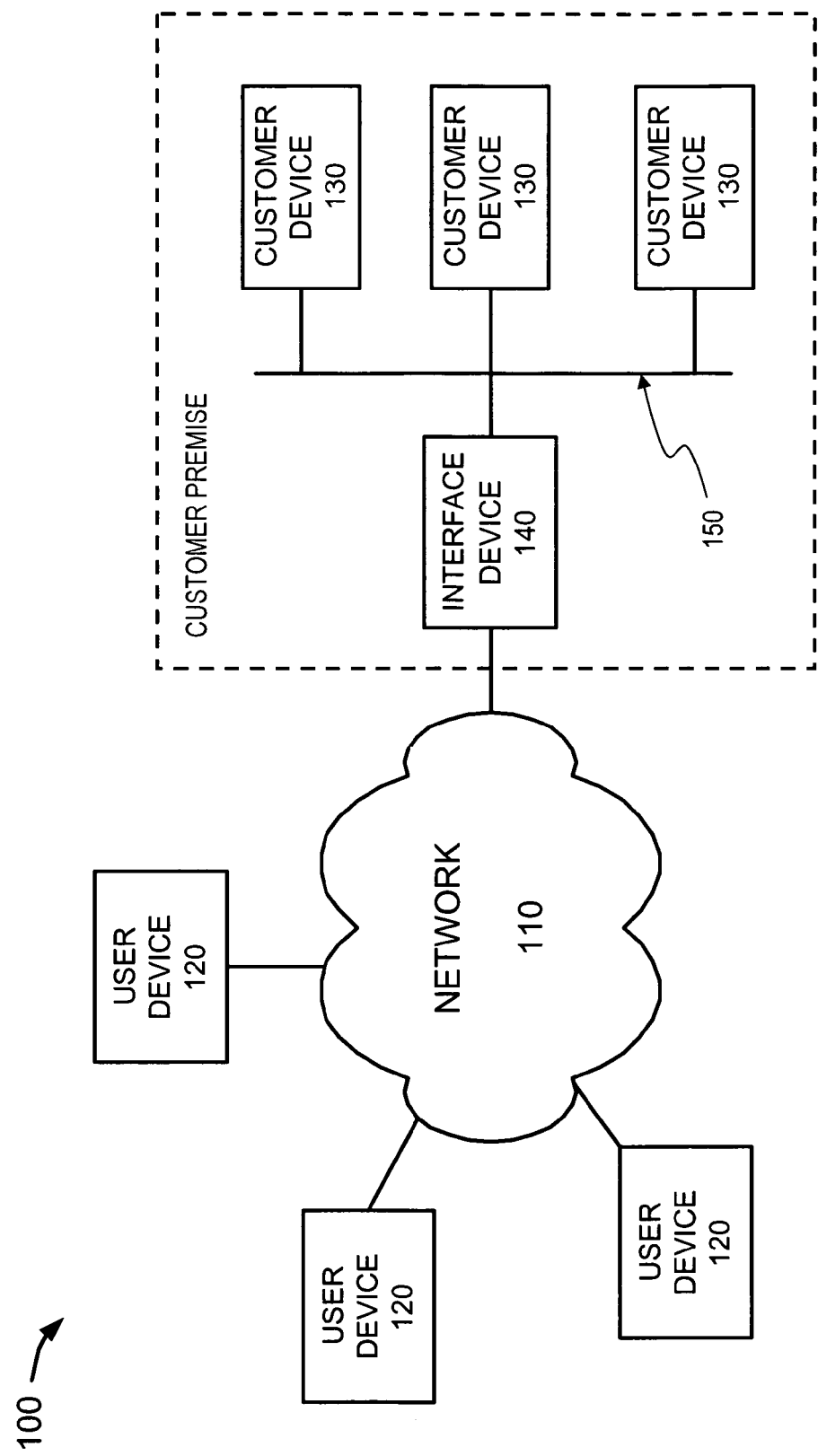
FIG. 1 is a diagram of a communication system utilizing an interface device at a customer premise to support integrated voice and data services, according to an embodiment of the present invention.

FIG. 1 is a diagram of a communication system utilizing an interface device at a customer premise to support integrated voice and data services, according to an embodiment of the present invention. A communication system 100 supports a group of user devices 120 that connect to a network 110 and are capable of communicating with one or more customer devices 130 via an interface device 140. The network 110 can include one or more networks, such as the Internet, an intranet, a local area network (LAN), a wide area network (WAN), and/or circuit-switched telephony networks (e.g., public switched telephone network (PSTN)), as well as any network that is capable of transmitting voice and data communications from a source device to a destination device. The network 110 can support a variety of technologies, such as frame relay, digital subscriber line (DSL), and Asynchronous Transfer Mode (ATM).

The user devices 120 include, by way of example, personal computers, laptops, Session Initiation Protocol (SIP) telephone devices, or other devices capable of transmitting/receiving voice and data communications to/from the network 110. The user devices 120 can connect to the network 110 via wired, wireless, or optical connections. The customer devices 130 can be any common customer telephone device, such as one or more analog telephones, private branch exchanges (PBXs), SIP telephone devices, and/or other types of wired or wireless devices. As shown in FIG. 1, the customer devices 130 may be part of a customer LAN 150.

According to one embodiment of the present invention, the interface device 140 is a stand-alone device that provides multiple secure communication services to the customer devices 130. To provide these communication services, the interface device 140 supports a variety of protocols, such as the Internet Protocol (IP), the Dynamic Host Configuration Protocol (DHCP), the Session Initiation Protocol (SIP), the User Datagram Protocol (UDP), the Transmission Control Protocol (TCP), the Session Description Protocol, the Real-time Transport Protocol (RTP), the Real-time Transport Control Protocol, the Audio Video Protocol, the T.38 fax protocol, the Internet Control Message Protocol (ICMP), and other types of communication protocols to exchange traffic between the network 110 and the customer LAN 150.

As will be more fully described below, the interface device 140 provides the customer devices 130 with digital subscriber line (DSL) and frame relay access to the network 110. The interface device 140 also provides voice ports for stand-alone analog telephones, T1 or fractional T1 voice trunks for PBX connectivity, Ethernet ports and routing capabilities for data devices, firewall functionality, network address translation (NAT) and port address translation (PAT) functionality, and QoS management.

Figure 2:
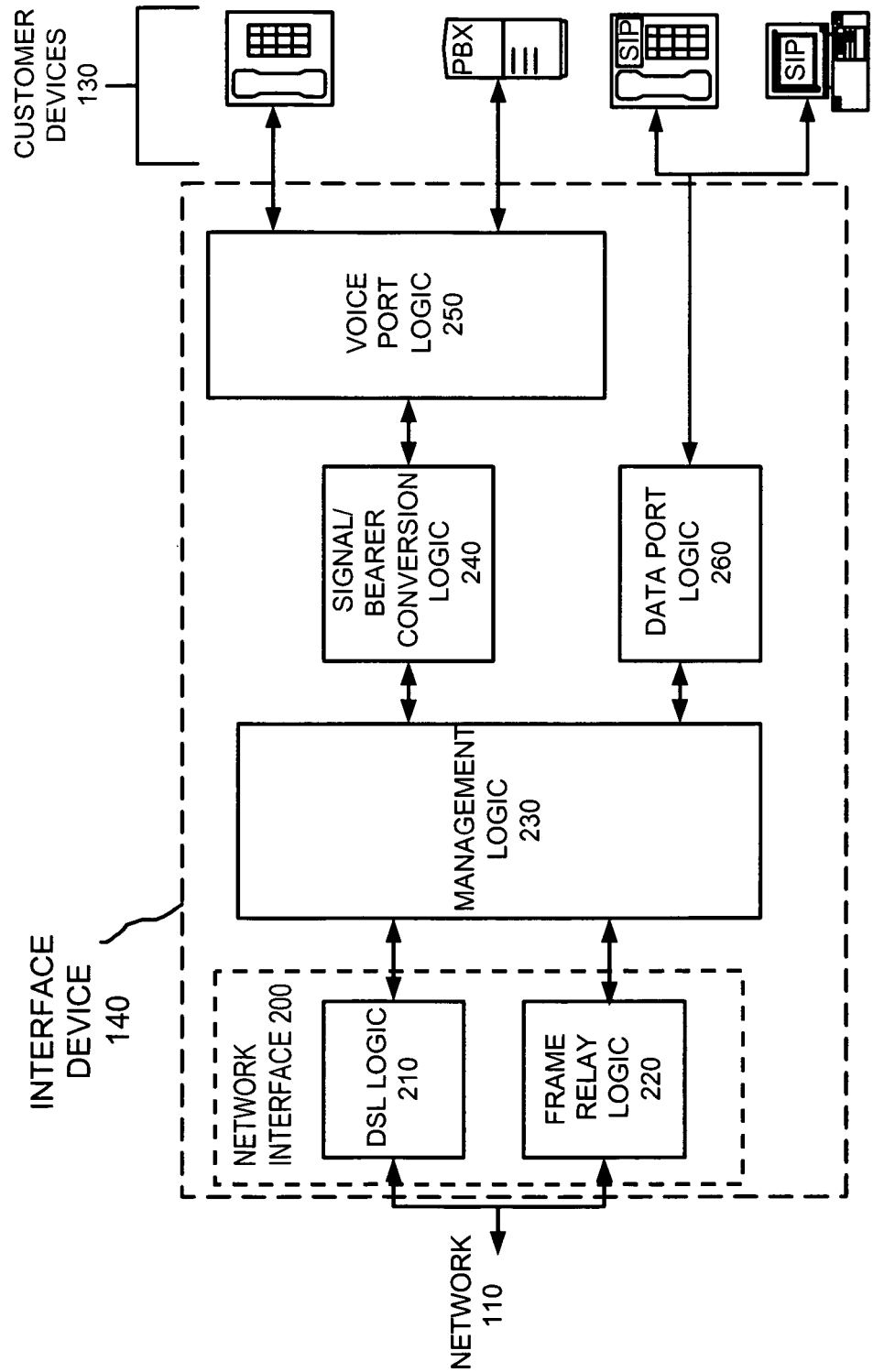
FIG. 2 is a diagram of the interface device used in the system of FIG. 1.

FIG. 2 is a diagram of the interface device used in the system of FIG. 1. By way of example, the interface device 140 includes a network interface 200 (which can be a Wide Area Network (WAN) interface) that can access the network 110, which in an exemplary embodiment, supports DSL and frame relay. Accordingly, the network interface 200 includes DSL logic 210 and frame relay logic 220. Although not shown, other interface logic can be supported, such as Fractional T1 and Full T1 WAN interface.

The interface device 140 also houses the following components: management logic 230, signal/bearer conversion logic 240, voice port logic 250, and data port logic 260. It is appreciated that the interface device 140 can include other logic than that illustrated in FIG. 2 that aid in the reception, processing, and/or transmission of data.

DSL logic 210 can include one or more DSL ports. In an exemplary embodiment, the DSL logic 210 can also has one or more RJ-11 interfaces. The DSL logic 210 supports standard DSL protocols for communicating with digital subscriber line access multiplexers (DSLAMs), such as an integrated services digital network (ISDN) digital subscriber line (IDSL) signaling protocol, a symmetric digital subscriber line (SDSL) signaling protocol, and a Global Standard High-bit-rate digital subscriber line (G.SHDSL) signaling protocol, and the like. According to an exemplary embodiment, the DSL logic 210 can support Asymmetrical DSL (ADSL), as described in American National Standards Institute (ANSI) T1E1.413.

Frame relay logic 220 can include one or more frame relay ports. According to one embodiment of the present invention, the frame relay logic 220 can include one or more digital signal 1 (DS1) ANSI T1.102 electrical line rate interfaces that support fractional T1 or full T1 line rates.

Management logic 230 manages operation of the interface device 140, and supports security and Quality of Service (QoS) functions for the interface device 140. The management logic 230 also provides for secure methods of file transfer, which can be used for the purpose of application upgrades, log downloads, etc.

The data port logic 260 provides data connectivity to the customer devices 130, such as a personal computer or other SIP-enabled station, as noted earlier. According to one embodiment of the present invention, the physical connection supports Ethernet connections to the personal computer or to the local area network (LAN) 150 within the customer premise. The data port logic 260 also supports Internet Protocol (IP) Version 4 (and Version 6). Additionally, the logic 260 supports Dynamic Host Configuration Protocol as defined in IETF RFC 2131, and multiple DNS entries. That is, if the primary DNS server does not respond to a DNS request, a secondary DNS server is queried.

The interface device 140 also provides routing functions for data and voice traffic. For example, the device 140 supports static routing, using Open Shortest Path First (OSPF). In addition, the device 140 provides Routing Information Protocol (RIP) Version 2 for Fractional T1 and Full T1 WAN interface and RIP Version 2 for DSL WAN interface.

The interface device 140 also supports trunk group-based routing; that is, routing based on trunk group prefix digits that are prepended by a Network Server (NS)/Redirect Server (RS) to the Request URI. A SIP Proxy Server (not shown), which is accessible by the interface device 140, is made up of two servers the Network Server (NS) and Redirect Server (RS). The NS acts as both a server and a client for the purpose of making requests on behalf of other clients. Requests are serviced internally or by passing them, possibly after translation, to other servers. A proxy interprets, and, if necessary, rewrites a request message before forwarding it. The RS accepts a SIP request, maps the address into zero or more new addresses and returns these addresses to the client. In addition, the RS also can be viewed as a location server where information about a possible terminating location could be obtained.

Trunk group-based routing involves mapping and manipulating called party identity between a circuit-switched telephony domain (e.g., PBX) and the IP domain (as more fully described in FIGS. 8 and 9). The interface device 140 selects an outgoing trunk group to a PBX based on the first four-digits in the Request-URI, for example. These four digits are referred to as a "trunk group prefix" and are prepended to the called number by the NS/RS. An outgoing trunk group to the PBX can be selected, based on a variable-length, alphanumeric trunk group prefix in the Request-URI (Uniform Resource Identifier). The interface device 140 can either delete or not delete the trunk group prefix from the called number string of the outgoing PRI or CAS call setup message. The interface device 140 can configure the Called Party Number's Type of Number (TON)/Nature of Address (NOA) on a per-trunk group basis, on calls terminating to a PRI trunk group. Also, the TON/NOA can be based upon the digit stream following the trunk group prefix, on calls terminating to a PRI trunk group.

The various logic 210, 220, 230, 240, 250, and 260 within the interface device 140 can include hardware, such as an application specific integrated circuit or a field programmable gate array, software, or a combination of hardware and software. Thus, the interface device 140 is not limited to any specific combination of hardware circuitry and software.

Figure 3:
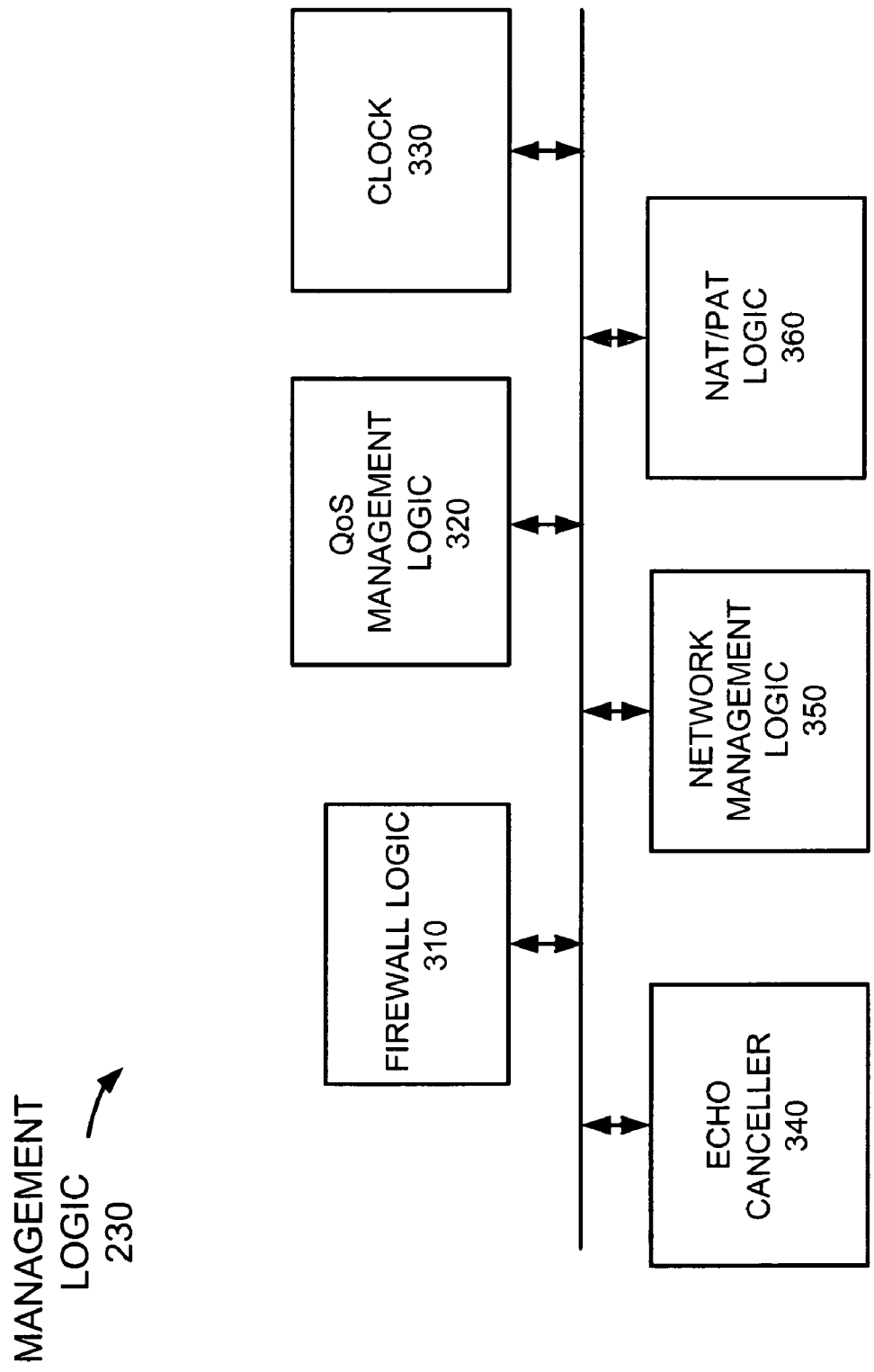
FIG. 3 is a diagram of the management logic employed in the interface device of FIG. 2.

FIG. 3 is a diagram of the management logic employed in the interface device of FIG. 2. Management logic 230 supports numerous functions through the following components: firewall logic 310, QoS management logic 320, a clock 330, an echo canceller 340, network management logic 350, and network address translation (NAT)/port address translation (PAT) logic 360. It is appreciated that management logic 230 can include other components that aid in the reception, processing, and/or transmission of data.

The firewall logic 310 provides packet filtering capabilities. Such filtering can be based on a set of rules that causes firewall logic 310 to perform a particular action on incoming traffic based on source Internet Protocol (IP) address, source transport address, destination IP address, destination transport address, and the like. The action includes, for example, permitting the received traffic to be forwarded to the customer devices 130 or discarding the traffic in the event that incoming traffic fails to satisfy the set of rules associated with the firewall logic 310. The firewall logic 310 can execute one or more dynamic rule sets for media based on SIP signaling.

The QoS management logic 320 provides QoS services (e.g., classification, scheduling, policing, etc.) for the interface device 140. The QoS services, in an exemplary embodiment, can include classifying incoming traffic flows, such as real-time transport protocol flows, based, for example, on packet header information (or other information). For example, the QoS management logic 320 classifies based on IP Type of Service bits, and supports a multi-field classifier. Also, the logic 320 can classify packets of an RTP flow. The classification can also be performed at the application layer (e.g., Layer 7 of the Open Systems Interconnection (OSI) model) to accommodate application protocols, such as File Transfer Protocol (FTP), that negotiate additional dynamic flows that are subject to static bandwidth policy. According to an embodiment of the present invention, the QoS management logic 320 can mark 802.1p priority bits based on the classification criteria.

Furthermore, the QoS management logic 320 can implement RFC 2686 Multi-Class Extension to Multi-Link Point-to-Point Protocol (PPP). Accordingly, the interface device 140 can map Differentiated Services bits, or more specifically Type of Service bits, to specific classes and can fragment both UDP and TCP packets based on that class.

The QoS management logic 320 can also implement class-based scheduling with priority queuing. Scheduling provides low delay, low delay variation, and low loss rate for VoIP flows, while not "starving out" other application flows. Thus, fair sharing within a class is also provided by the interface device 140. That is, sharing of bandwidth is made fair such that the first flow within a class does not starve out other flows within the same class. Additionally, the interface device 140 implements a per flow admission control capability that denies admission of new flows when a flow limit for a class is reached. This capability allows restriction of voice calls to an upper limit. Accordingly, the QoS management logic 320 can remark new flows that violate upper flow limits to different TOS markings or DSCP such that flows above the upper limit are mapped to a lower priority class. The QoS management logic 320 also supports setting or tuning of queue depth within the priority queue to minimize delay variation.

Further, the QoS management logic 320 may also provide reporting capabilities, such as providing bandwidth usage reports, statistics on the number of dropped packets on a flow or class basis, traffic reports, such as traffic breakdown by user, by site, by network connection, etc., or other reports of interest to the customer.

A clock 330 provides a reference clock signal for use by the interface device 140. The clock 330 may derive the reference clock signal from selected interfaces and/or from external timing interfaces (e.g., from an external DS1 timing interface). The interface device 140 may use the reference clock signal for synchronization purposes and/or for jitter/wander requirements. Echo canceller 340 provides echo control/cancellation for the interface device 140. For example, the echo canceller 340 includes an International Telecommunications Union (ITU) G.168—compliant echo canceller.

The network management logic 350 provides fault management, configuration management, accounting, performance management, and security functions for the interface device 140. With respect to fault management, the network management logic 350 detects, logs, and notifies users of, and, if possible, repairs problems to keep the network running effectively. The network management logic 350 can include alarm mechanisms to alert users or network administrators of, for example, system faults, network interface problems, hardware/software failures, and the like. Additionally, the network management logic 350 may log protocol events (for both circuit-switched and SIP protocols) as they relate to call processing, call failures, and call abandonments with an explanation of the cause, and incoming messages that are incorrectly formatted, timestamp the logs, and monitor the number of active calls on the interface device 140 at any given time.

With respect to configuration management, the network management logic 350 may monitor network and the interface device 140 configuration information so that any effects on network operation of various hardware and software elements can be tracked and managed. In accordance with an embodiment of the present invention, the network management logic 350 adheres to the standard SIP Management Information Base (MIB) User-Agent requirements.

With respect to accounting, the network management logic 350 can measure network-utilization parameters so that individual or groups of users on the network can be regulated appropriately. This information may be used for creation of billing information, as well as usage patterns.

Regarding performance management, the network management logic 350 may measure and make available aspects of network performance, such as network throughput, user response times, and line utilization, so that inter-network performance can be maintained at an acceptable level. The network management logic 350 provides users with the ability to view the status of various interface device 140 components, such as Foreign Exchange Station (FXS)/Foreign Exchange Office (FXO) voice ports, trunk groups, and the like, and to enable and disable components of the interface device 140. The network management logic 350 can also provide real-time statistics and counters related to a traffic stream. The statistics and counters may track jitter, latency, lost packets, error packets, packets that are out of sequence, dialed call completions, and etc.

As part of its management function, the interface device 140 supports various file transfer mechanisms. For instance, to provide for secure methods of file transfer, for the purpose of application upgrades, log downloads, etc., the device 140 can provide the following Secure Socket Layer (SSL) web-based upload/download mechanisms: Secure Copy, SSH—Remote Console, and Secure File Transfer Protocol (FTP).

With respect to security management, the network management logic 350 may control access to network resources so that the customer's network cannot be compromised, and those without appropriate authorization cannot access sensitive information. The network management logic 350 rejects or allows messages based on the IP address of the sender.

The network management logic 350 may also provide the ability to remotely control and configure the interface device 140. Alternatively, the network management logic 350 may allow the interface device 140 to be controlled and/or configured via a serial connection. In either event, the network management logic 350 may allow for the creation, modification, and editing of bandwidth policy, or the addition or modification of customer features and/or services. Access to the interface device 140 may occur via a secure terminal emulation protocol, such as Secure Shell (SSH).

NAT/PAT logic 360 provides security and signal processing for traffic transmitted between customer devices 130 and network 110. The NAT/PAT logic 360 also provides topology hiding capabilities, as illustrated in FIG. 4.

Figure 4:
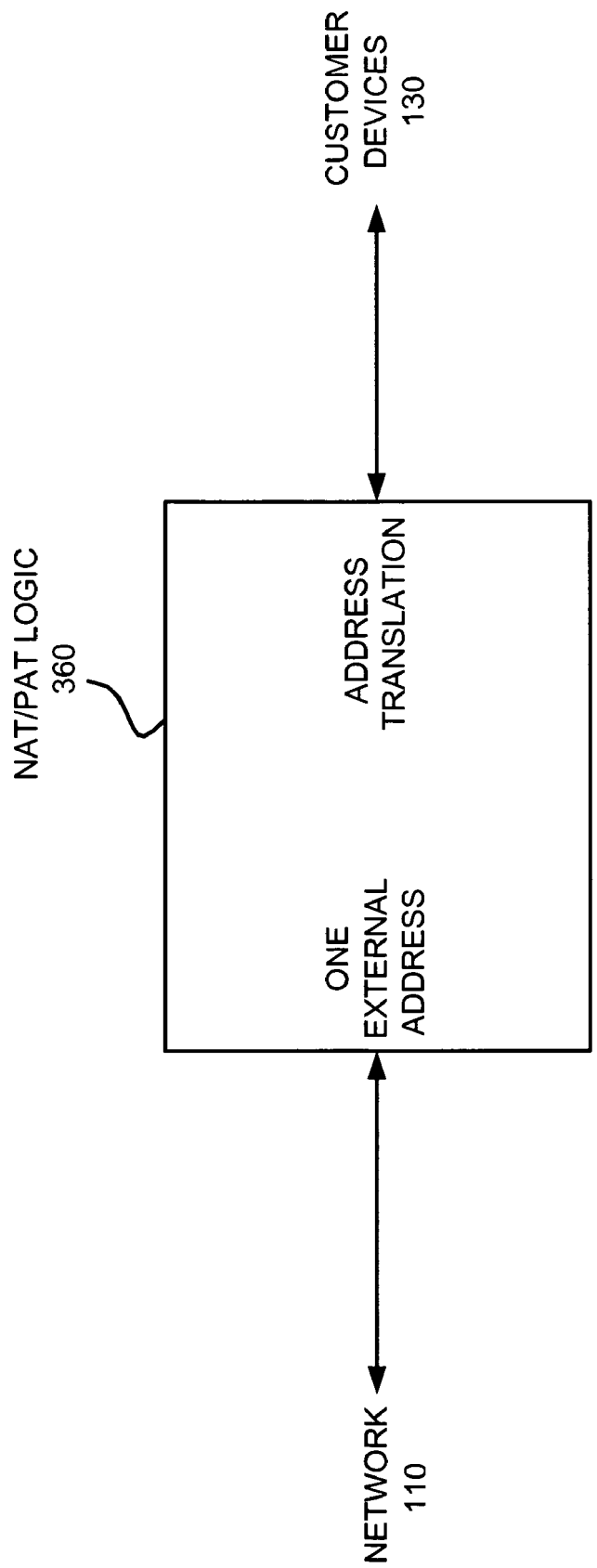
FIG. 4 is a diagram showing a topology hiding operation of the network address translation (NAT)/port address translation (PAT) logic of FIG. 3.

FIG. 4 is a diagram showing a topology hiding operation of the network address translation (NAT)/port address translation (PAT) logic of FIG. 3. To minimize security risk, the NAT/PAT logic 360 hides the topology of the internal network 150 with the customer premise from external devices by translating network addresses and/or port addresses associated with the customer devices 130 to one external address (e.g., registered, global IP address). It is recognized that SIP, the session description protocol (SDP), and the real-time transport control protocol (RTCP) embed host names, as well as IP addresses, into packets. Accordingly, to hide the internal network topology, the NAT/PAT logic 360 modifies NAT, PAT, or secure flow processing (SFP) functionality to hide all internal addresses that may be embedded within SIP and RTCP packets with the external IP addresses as they traverse the interface device 140.

According to an embodiment of the present invention, the NAT/PAT logic 360 dynamically assigns network addresses and port addresses to customer devices 130. The NAT/PAT logic 360 performs network address and port address translation at, for example, the Session Layer, Presentation Layer, and/or Application Layer.

Returning to FIG. 2, a signal/bearer conversion logic 240 performs all necessary conversions for traffic transmitted between management logic 230 and voice port logic 250. In an embodiment of the present invention, the signal/bearer conversion logic 240 performs signaling protocol conversion for traffic transmitted between a telephone switch (e.g., PBX switch) and the management logic 230. The signaling protocol conversion can include, for example, conversions between the SIP signaling protocol and the Integrated Services Digital Network (ISDN) signaling protocol. The signal/bearer conversion logic 240 may also perform bearer channel conversion for traffic transmitted between an analog telephone and management logic 230. The bearer channel conversion can include, for example, conversions between an RTP format and an analog format.

Voice port logic 250 includes one or more ports for supporting Foreign Exchange Station (FXS) and Foreign Exchange Office (FXO) voice lines and fractional T1 and full T1 voice trunks. The voice port logic 250, in an exemplary embodiment, provides one or more RJ-11 FXS voice port electrical line rate interfaces, one or more RJ-11 FXO voice port electrical line rate interfaces, and one or more DS1 ANSI T1.102 electrical line rate interfaces. The voice port logic 250 supports various signaling protocols, such as Foreign Exchange Station Loop Start (FXSLS), Foreign Exchange Office Loop Start (FXOLS), Foreign Exchange Station Ground Start (FXSGS), Foreign Exchange Office Ground Start (FXOGS), American National Standards Institute (ANSI) PRI (Q.931) signaling protocol, and the like. Voice port logic 250 may also support Channel Associated Signaling (CAS) trunk types, dual tone multi-frequency (DTMF) dialed number transmittal and receipt over CAS trunk groups, multi-frequency (MF) dialed number transmittal and receipt over CAS trunk groups, sub-T1-size CAS trunk groups, and etc.

Figure 5:
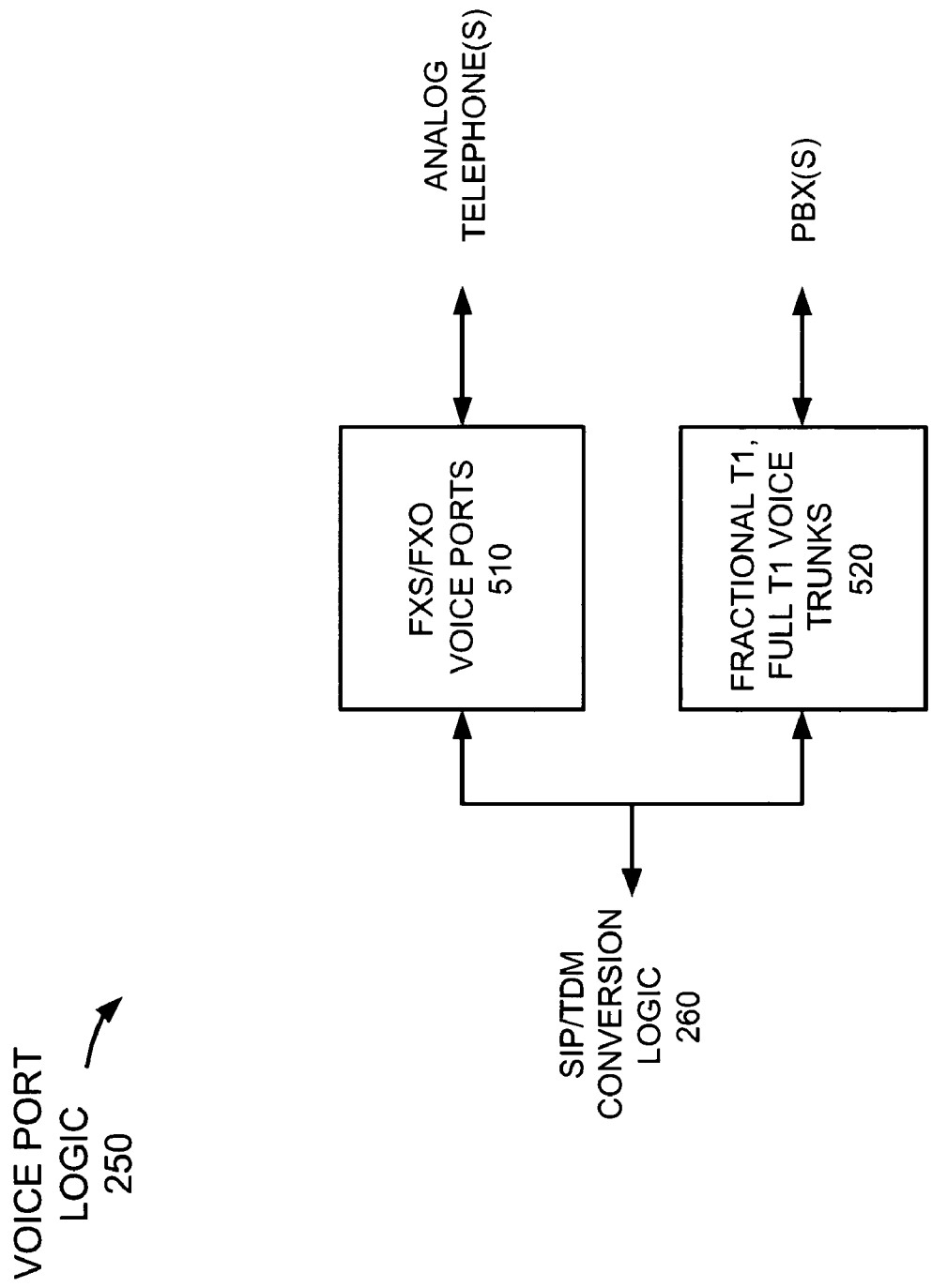
FIG. 5 is a diagram of the voice port logic of FIG. 2.

FIG. 5 is a diagram of the voice port logic of FIG. 2. The voice port logic 250 can include voice ports 510 and voice trunks 520. The voice ports 510, in an exemplary embodiment, support FXS/FXO voice lines for analog telephones. Moreover, the voice trunks 520 provide fractional T1 and/or full T1 line rates, and connect to one or more PBXs.

Returning to FIG. 2, the data port logic 260, in an exemplary embodiment, includes one or more ports for supporting 1×N base-T Ethernet (where N equals, 10, 100, 1000, etc.). For instance, the data port logic 260 supports 10 Mb/s half duplex Ethernet, 10 Mb/s full duplex Ethernet, 100 Mb/s half duplex Ethernet, 100 Mb/s full duplex Ethernet, 10/100 half/full auto-negotiation, wireless networking, and virtual local area network (VLAN) tagging.

Figure 6:
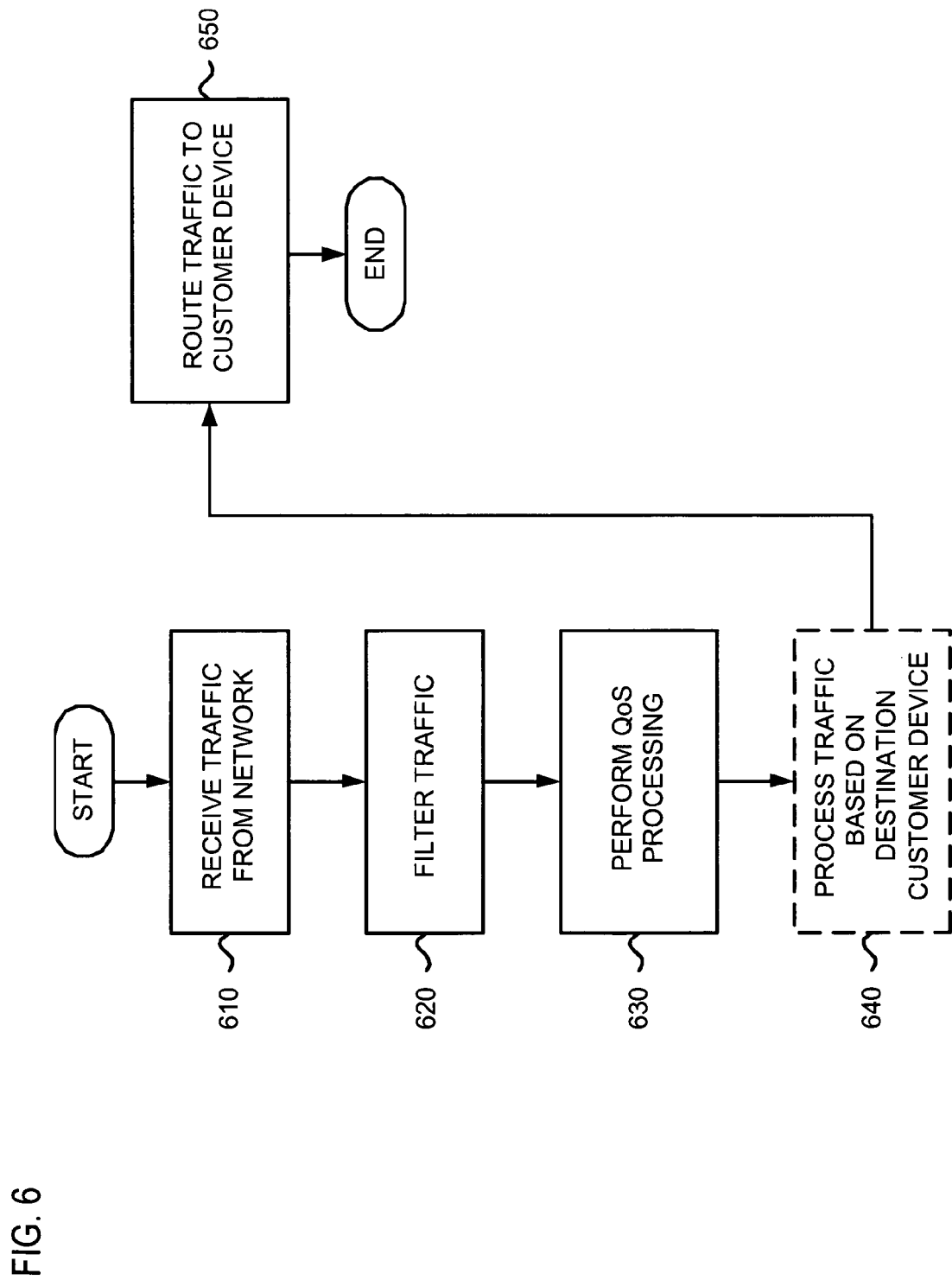
FIG. 6 is a flowchart of a process for routing traffic from a network through the interface device of FIG. 2.

FIG. 6 is a flowchart of a process for routing traffic from a network through the interface device of FIG. 2. Processing begins with the interface device 140 receiving traffic from a user device 120 via network 110 (step 610). For the purposes of explanation, it is assumed that the received traffic is SIP traffic; however, it is contemplated that the interface device 140 can operate with other traffic types (e.g., ITU H.323). The traffic is received via DSL logic 210 or frame relay logic 220 and may, for example, be in the form of packets.

Once received, the traffic may be filtered via firewall logic 310 (FIG. 3) (step 620). The firewall logic 310 then examines the incoming traffic and determines, based on a predetermined set of rules, whether to discard the traffic or forward the traffic toward its destination. In an exemplary embodiment, the firewall logic 310 can filter traffic based on source IP address, source transport address, destination IP address, and destination transport address.

The interface device 140 then performs QoS processing on the traffic, per step 630. The QoS management logic 320, for example, classifies the traffic and schedules the traffic according to the classification. Based on the particular destination— the customer device 130 to which the traffic is destined—the interface device 140 processes the traffic to put the traffic in a format suitable for the particular destination customer device 130, as in step 640. For example, if the traffic is to be transmitted to an analog telephone or a PBX, the interface device 140 performs any necessary bearer channel conversion or signaling conversion. In those situations where the received traffic is destined for a SIP-based device, such as a SIP telephone, signal processing may not be necessary.

The interface device 140 then transmits the traffic to the appropriate customer device 130 (step 650). The traffic is transmitted via voice port logic 250 or data port logic 260, based upon the particular customer device 130 to which the traffic is destined. If, for example, the traffic is destined for an analog telephone or a PBX, the interface device 140 transmits the traffic through voice port logic 250. If, on the other hand, the traffic is destined to a SIP device, such as a SIP telephone, the interface device 140 transmits the traffic through the data port logic 260.

Figure 7:
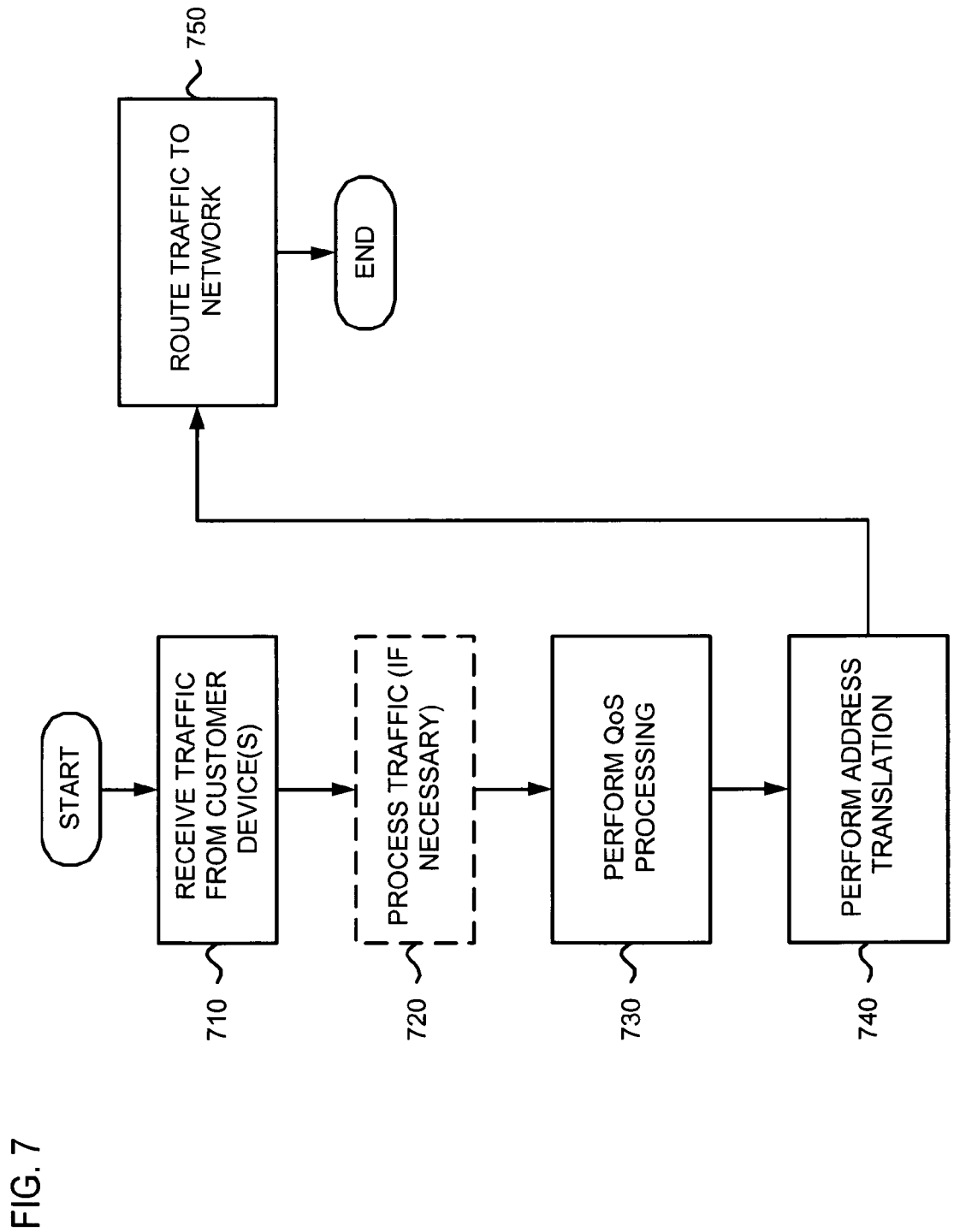
FIG. 7 is a flowchart of a process for routing traffic from one or more customer devices through the interface device of FIG. 2.

FIG. 7 is a flowchart of a process for routing traffic from one or more customer devices through the interface device of FIG. 2. In step 710, the interface device 140 receives traffic from one or more customer devices 130. The traffic may be received via voice port logic 250 or data port logic 260 and may, for example, be in the form of packets, analog signals, or ISDN signals.

Based on the particular customer device 130 from which the traffic is received, the interface device 140 processes the traffic in a form suitable for transmission over the network 110 (step 720). For example, if the traffic is received via the voice port logic 250, the interface device 140 performs the necessary bearer channel conversion or signaling conversion. In those situations in which the traffic is received via the data port logic 260, signal processing may not be necessary since the traffic may already be in an appropriate form for transmission to the network 110.

In step 730, the interface device 140 then performs QoS processing on the traffic. The QoS management logic 320 classifies the traffic and schedules such traffic for transmission. In step 740, the interface device 140 translates a source address associated with the received traffic to a network address. This address translation can be NAT or PAT, thereby acting to hide addresses of customer devices 130 from user devices 120 connected to network 110. As described above, the address translation can be performed at the Session Layer, Presentation Layer, and/or Application Layer.

The interface device 140 transmits the traffic to the network 110, per step 750. The traffic is transmitted via DSL logic 210 or frame relay logic 220 and may be formatted accordingly, based upon the particular port (i.e., DSL or frame relay) from which the traffic is transmitted.

Figure 8A:
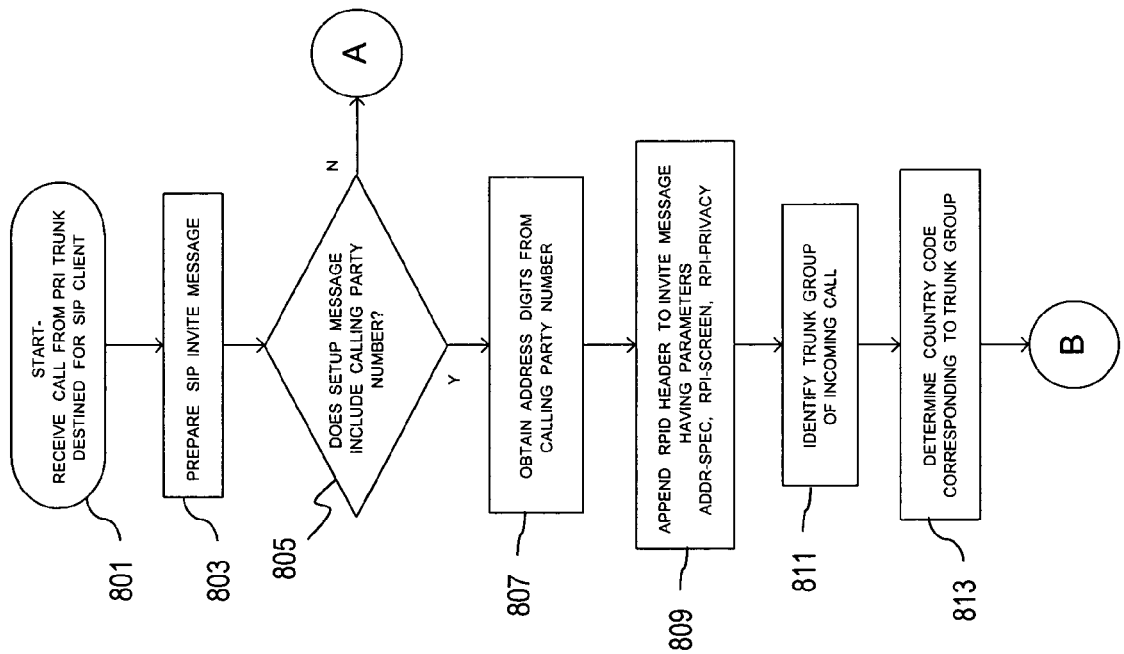
FIGS. 8a and 8b are a flowchart of a process for converting Time Division Multiplexing (TDM) signaling to Session Initiation Protocol (SIP) signaling to support call processing, according to an embodiment of the present invention.
Figure 8B:
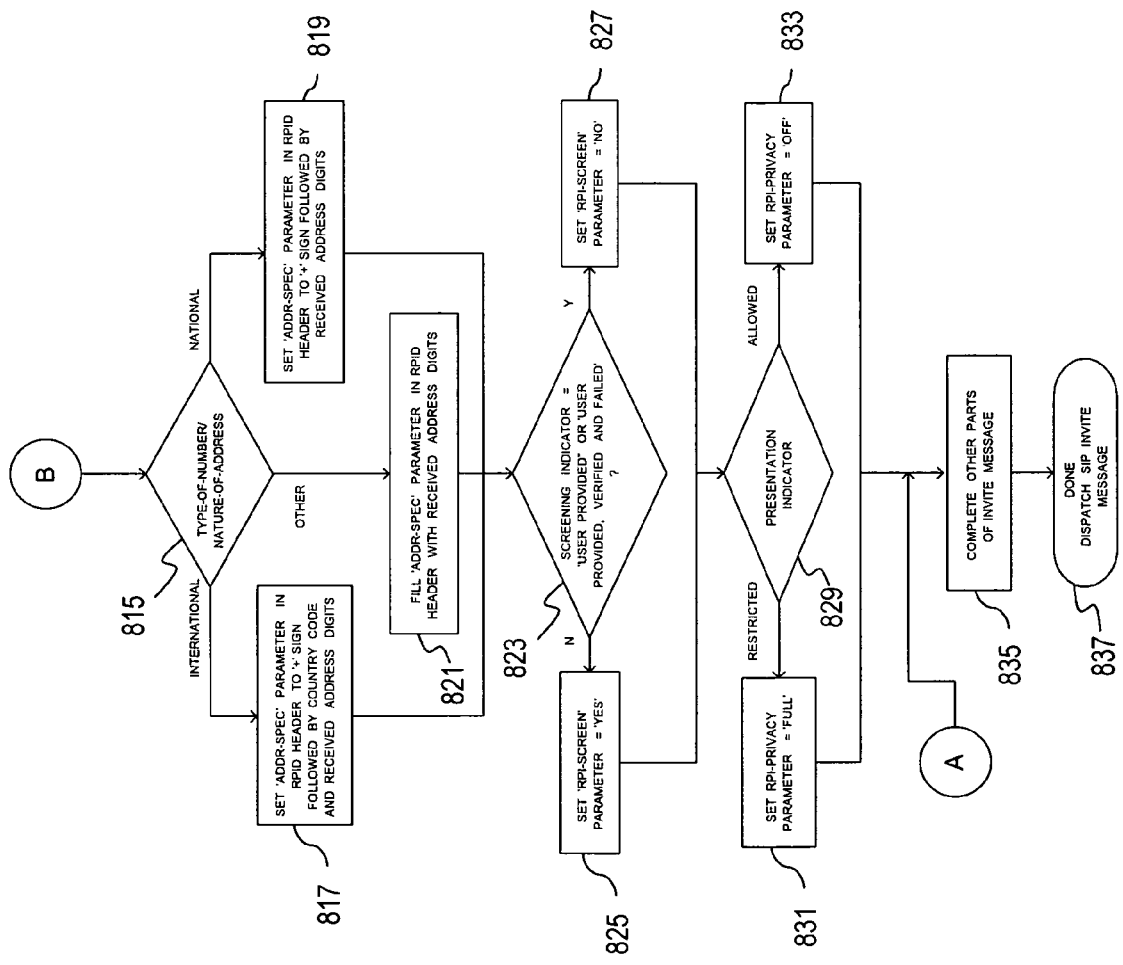

FIGS. 8*a* and 8*b* are a flowchart of a process for converting Time Division Multiplexing (TDM) signaling to Session Initiation Protocol (SIP) signaling to support call processing, according to an embodiment of the present invention. This process supports the mapping of originating caller identity (calling party) between a circuit-switched telephone network domain (e.g., PBX network) and the IP domain.

In step 801, the interface device 140 receives a call that is destined for a SIP client (e.g., device 130) over a PRI trunk. Accordingly, the interface device 140 prepares a SIP INVITE message, per step 803. Next, it is determined whether the call set up message specifies a calling party number, as in step 805. If a calling party number is provided, the interface device 140 obtains, as in step 807, the appropriate address digits from the calling party number. The interface device 140 then appends, as in step 809, a Remote-Party-ID (RPID) header to the SIP INVITE message, wherein the header information includes ADDR-SPEC, RPI-SCREEN, and RPI-PRIVACY parameters.

For the purposes of explanation, the process is described with respect to calls incoming PRI and terminating with SIP; however, it is recognized that the process pertains to CAS as well. The interface device 140 populates the From header with a configurable, alphanumeric value (e.g., "unknown"<sip:unknown@xxxx.xxx>) when it receives signaling of type CAS, for example. With respect to PRI, the From header is similarly populated when the device 140 receives signaling of type PRI with no Calling Party Number information element (IE) present in a SETUP message. The value follows the normal SIP rules for the From header (e.g., IPv4 address, domain name, etc.). Population of the Display Name is optional; however, if the Display Name is populated this parameter needs to match the user part of the SIP URL in the From header. The interface device 140 populates the From header with a configurable, alphanumeric value (i.e., "anonymous"<sip:anonymous@xxxx.xxx>) when the device 140 receives PSTN signaling of type PRI with Calling Party Number IE present in the SETUP message, and the Presentation Indicator is Restricted.

When Calling Party Number digits are mapped to the From header, the interface device 140 is able to configure a country code against the originating trunk group that can be used in formatting the From header. The following rules apply for formatting the user part of the SIP URL in the From header, using the received TON/NOA along with the configured country code, as shown in Table 1, below.

TABLE 1

| Received NOA/TON | User Part of From Header |
| --- | --- |
| National | E.164 format: '+' followed by a configurable country code, followed by received address digits |
| International | E.164 format: '+' followed by received address digits |
| All other values | Non-E.164 format: address digits |

The interface device 140, per step 811, identifies the trunk group of the incoming call, and subsequently determines the country code corresponding to the identified trunk group (step 813). As shown in FIG. 8*b*, the interface device 140 next determines whether the call is a national, international, or some other call based on the type of number and nature of the address, as in step 815. Per the rules enumerated in Table 1, if the call is an international call, the ADDR-SPEC parameter in the RPID header is set, for example, to a "+" sign followed by the country code and the received address digits, per step 817. However, if the call is a national call, the RPID header is set, as in step 819, only with the "+" sign followed by the received address digits. For all other calls, the ADDR-SPEC parameter in the RPID header is simply populated with the received address digits (step 821).

In step 823, the interface device 140 checks whether the SCREEN INDICATOR parameter is set to "User Provided" or "User Provided, Verified, and Failed." If none of these conditions are satisfied, the RPI-SCREEN parameter is set to "YES" (step 825); otherwise, the RPI-SCREEN parameter is set to "NO" (step 827). Thereafter, the interface device 140 examines the presentation indicator, as in step 829; if the indicator specifies a restriction, then the RPI-PRIVACY parameter is set to "YES" (step 831). If no restriction exists, then the interface device 140, per step 833, sets the RPI-PRIVACY parameter to "NO." Next, the remaining INVITE message is prepared, as in step 835. In step 837, the SIP INVITE message is transmitted to the SIP client.

The above process, thus, provides conversion from TDM signaling to SIP signaling. The conversion from SIP to TDM signaling is explained below with respect to FIGS. 9*a* and 9*b*.

Figure 9A:
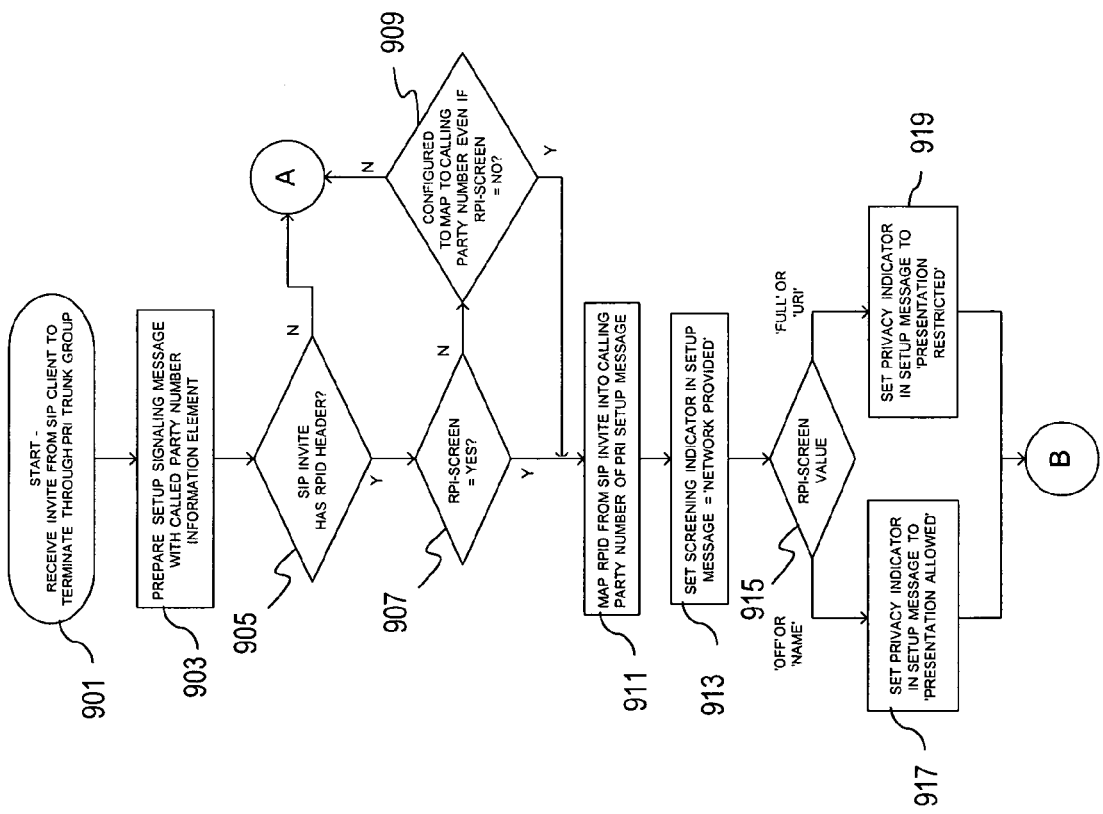
FIGS. 9a and 9b are a flowchart of a process for converting Session Initiation Protocol (SIP) signaling to Time Division Multiplexing (TDM) signaling to support call processing, according to an embodiment of the present invention.
Figure 9B:
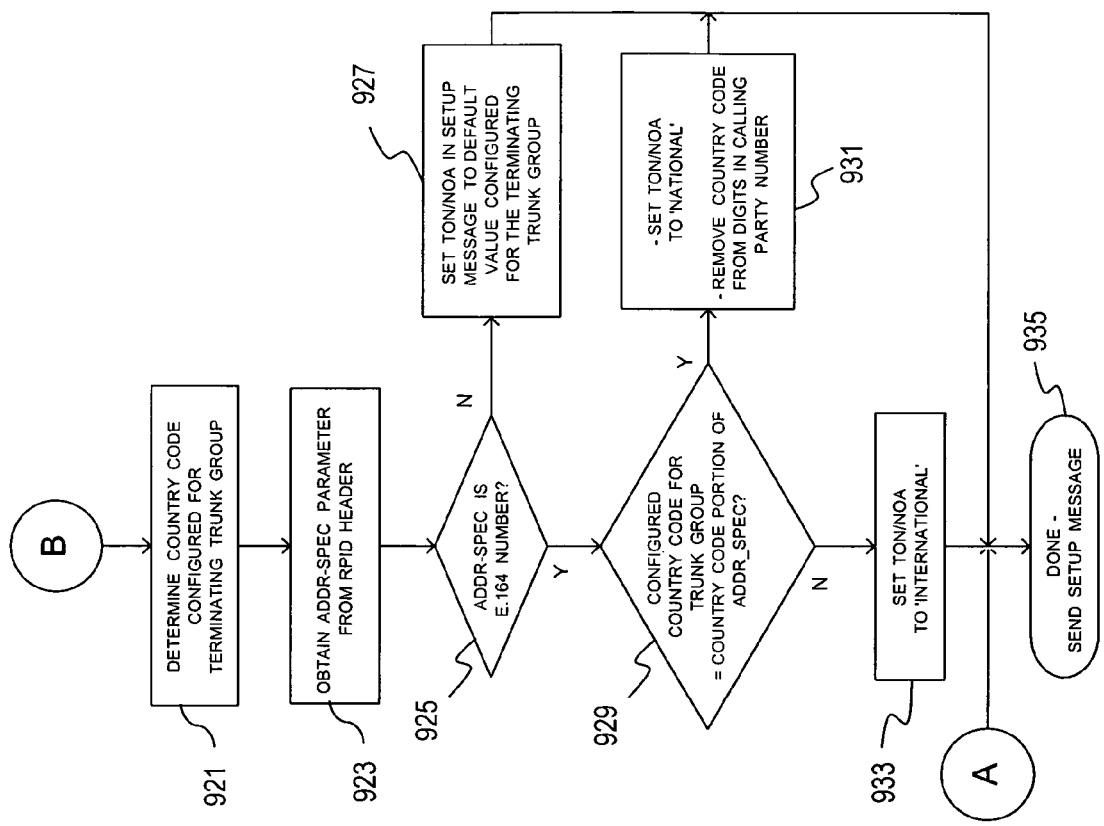

FIGS. 9*a* and 9*b* are a flowchart of a process for converting Session Initiation Protocol (SIP) signaling to Time Division Multiplexing (TDM) signaling to support call processing, according to an embodiment of the present invention. In step 901, the interface device 140 receives a SIP INVITE message from a customer device 130 that is a SIP client. The INVITE message pertains to a call that is to be transported over a PRI trunk group. Upon receipt of such a message, the interface device 140 then prepares a SETUP message, as in step 903, with a called party number information element (IE). Next, the interface device 140 determines whether the SIP INVITE message contains a Remote-Party-ID (RPID) header, as in step 905.

The Remote-Party-ID header is employed for the reliable transport of Calling Party Number information to and from a telephone switch (e.g., PBX). The interface device 140 generates a Remote-Party-ID header and populates the ADDR-SPEC parameter with the Calling Party Number address digits, when the device 140 receives PSTN signaling of type PRI with Calling Party Number IE present in the SETUP message.

The interface device 140 can configure a country code against the originating trunk group that can be used in formatting the Remote-Party-ID header. According to an embodiment of the present invention, the following rules apply for formatting the ADDR-SPEC parameter, using the received TON/NOA together with the configured country code (Table 2).

TABLE 2

| Received NOA/TON | Outgoing ADDR-SPEC Parameter of Remote-Party-ID (RPID) |
|---|---|
| National | E.164 format: '+' followed by a configurable country code, followed by received address digits |
| International | E.164 format: '+' followed by received address digits |
| All other values | Non-E.164 format: address digits |

If the SIP INVITE message has the RPID header, the device 140 examines whether the RPI-SCREEN field is set to "YES," per step 907. If not, the interface device 140 checks whether the message can be mapped to a calling party number (step 909). That is, the interface device 140 maps the screening indicator to the RPI-screen parameter. Screening indicator values of "USER PROVIDED" and "USER PROVIDED, VERIFIED, AND FAILED" maps to RPI-screen value of "NO." All other screening indicators are mapped to RPI-screen value of "YES."

Accordingly, the interface device 140, per step 911, maps the RPID header from the SIP INVITE message into a calling party number of PRI Setup message. If the Remote-Party-ID header is received, and it is determined that it should be mapped to Calling Party Number, then the interface device 140 sets the privacy indicator and screening indicator in the outgoing SETUP Calling Party Number IE according to Table 3:

TABLE 3

| Received RPI-screen | Outgoing Privacy Indicator | Outgoing Screening Indicator |
|---|---|---|
| Full | Presentation Restricted | Network Provided |
| URI | Presentation Restricted | Network Provided |
| Off | Presentation Allowed | Network Provided |
| Name | Presentation Allowed | Network Provided |

Thus, the "Screening Indicator" field within the PRI Setup message is set to "Network Provided," per step 913. Thereafter, the interface device 140 checks the value of the RPI-SCREEN field, as in step 915, whereby if the field specifies "OFF" or "NAME," the Privacy Indicator in the Setup message is set to "Presentation Allowed" (step 917). If the RPI-SCREEN value specifies "Full" or "URI," then the Privacy Indicator is set to "Presentation Restricted."

In step 921 (shown in FIG. 9*b*), the interface device 140 determines the country code that is configured for the terminating trunk group. In step 923, the ADDR-SPEC parameter is obtained from the RPID header of the SIP INVITE message, wherein the interface device 140 inspects whether the ADDR-SPEC is an E.164 number (step 925). If the ADDR-SPEC field does not specify an E.164 number, the Type of Number (TON)/Nature of Address (NOA) field in the Setup message is populated with a default value associated with the terminating trunk group, per step 927. The interface device 140 sets the TON/NOA in the outgoing SETUP Calling Party Number IE per Table 4 below:

TABLE 4

| Received ADDR-SPEC Digit Format | Outgoing TON/NOA |
|---|---|
| E.164 | International - if the configured country code does not match the first digits of the ADDR-SPEC |
| E.164 | National - if the configured country code does match the first digits of the ADDR-SPEC (The country code should be stripped from the address digits in this scenario). |
| Non-E.164 | Per-trunk group configurable default value |

However, if an E.164 number is indicated, then the device 140 compares whether the country code for the trunk group matches the country code information stored in the ADDR-SPEC field (step 929). If there is a match, per step 931, the TON/NOA field is set to "National," and the country code is removed from the digits in the calling party number. If there is no match, the TON/NOA field is set to "International," as in step 933. Thereafter, the Setup message is transmitted, per step 935.

The integrated SIP-enabled CPE device 140, as described above, provides customers with multitude of voice and data services, including a firewall, QoS processing, routing capabilities, and Ethernet switching functionality, for example. This single CPE device allows customers to update or add new features and/or services without having to continually purchase new hardware to obtain these features/services.

Figure 10:
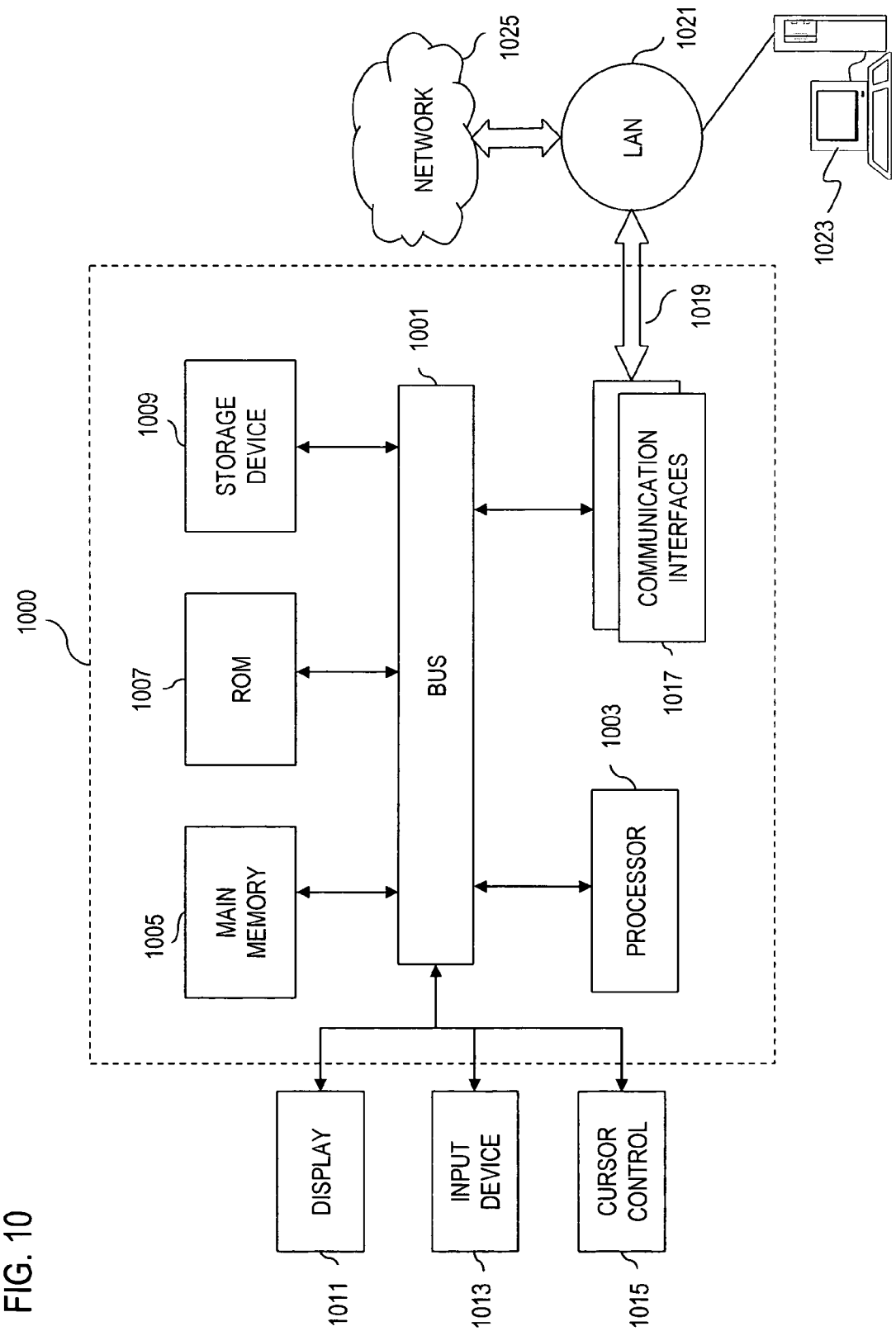
FIG. 10 is a diagram of a computer system that can be used to implement an embodiment of the present invention.

FIG. 10 illustrates a computer system 1000 upon which an embodiment according to the present invention can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to one embodiment of the invention, the SIP client and server can be provided by the computer system 1000 in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g., for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g., a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the present invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1005 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. An apparatus, comprising:
   a network interface configured to receive a call from a packet switched network to a called party device; and
   one or more processors configured to execute,
   management logic to determine whether the call is to a called party device on a packet switched network or to a called party device on a non-packet switched network,
   data port logic to route the call to the called party device residing on the packet switched network, and
   signaling conversion logic to convert signaling of the call from packet switched network signaling to non-packet switched network signaling if the call is to a called party device on a non-packet switched network, the conversion including,
   obtaining an address specification parameter associated with the call based on signaling of the packet switched network,
   determining whether the address specification parameter corresponds to a directory number compatible with the non-packet switched network, and
   specifying a terminating trunk group of the non-packet switched network based on the determination; and a voice port configured route the call to the called party device residing on the non-packet switched network.

2. The apparatus of claim 1, further comprising a firewall coupled to the network interface for filtering the call.

3. The apparatus of claim 1, wherein the network interface communicates with one of a Digital Subscriber Line (DSL) network or a frame relay network.

4. The apparatus of claim 1, wherein the call includes a plurality of packets, the processor being further configured to execute:
Quality of Service (QoS) logic to classify the plurality of packets according to a predetermined QoS policy.

5. The apparatus of claim 1, the processor being further configured to execute:
network management logic to detect and report a fault within the apparatus, to monitor configuration information of the apparatus, to measure a network utilization parameter for billing and accounting, and to determine performance statistics.

6. The apparatus of claim 1, wherein the one or more processors are configured to execute the conversion logic to generate one of a bearer channel or signaling for the non-packet switched network.

7. A method, comprising:
determining, at a processor, whether a call from a packet switched network is to a called party device on the packet switched network or to a called party device on a non-packet switched network;
routing, at the processor, the call to the called party device residing on the packet switched network if the call is to a called party device on the packet switched network;
converting, at the processor, signaling of the call from packet switched network signaling to non-packet switched network signaling if the call is to a called party device on a non-packet switched network, the converting step includes,
obtaining an address specification parameter associated with the call based on signaling of the packet switched network,
determining whether the address specification parameter corresponds to a directory number compatible with the non-packet switched network, and
specifying a terminating trunk group of the non-packet switched network based on the determination; and
routing, at the processor, the call to the called party device on the non-packet switched network.

8. The method of claim 7, further comprising filtering, at the processor, the data of the call received from the packet switched network using a firewall.

9. The method of claim 7, wherein the call is received from one of a Digital Subscriber Line (DSL) network or a frame relay network.

10. The method of claim 7, wherein the data of the call received from the packet switched network includes a plurality of packets, the method further comprising:
classifying, at the processor, the packets according to a predetermined QoS policy.

11. The method of claim 7, further comprising:
communicating, at the processor, with a telephone switch configured to terminate the call to the called party device.

12. The method of claim 7, wherein the converting includes generating one of a bearer channel or signaling for the non-packet switched network.

13. A method, comprising:
routing, at a processor, a first call, received from a device on a first packet switched network, to a second packet switched network;
converting, at the processor, signaling of a second call, received from a device on a second packet switched network, from packet switched network signaling to a non-packet switched network signaling, if the second call is destined to a called party device on the non-packet switched network, the conversion including,
obtaining an address specification parameter associated with the second call based on signaling of the second packet switched network,
determining whether the address specification parameter corresponds to a directory number compatible with the non-packet switched network, and
specifying a terminating trunk group of the non-packet switched network based on the determination; and
routing, at the processor, the second call to the non-packet switched network.

14. The method of claim 13, wherein the converting includes generating one of a bearer channel or signaling for the non-packet switched network.

15. The method of claim 13, wherein the first call is received by a data port.

16. The method of claim 13, wherein the second call is received by a voice port.

17. The method of claim 13, wherein the second call includes information identifying a destination address, the method further comprising:
translating, at the processor, the information identifying a destination address to an address in the second packet switched network.

18. The method of claim 13, wherein the second packet switched network is one of a Digital Subscriber Line (DSL) network or a frame relay network.

19. The method of claim 13, further comprising:
communicating, at the processor, with a telephone switch configured to transmit the call from the device on the non--packet switched network.

* * * * *